US012770303B1

(12) United States Patent
Gez et al.

(10) Patent No.: US 12,770,303 B1
(45) Date of Patent: Oct. 20, 2026

(54) DYNAMICALLY DISPLAYING PERFORMANCE PARAMETERS OF A GROUP OF STORAGE CLUSTERS

(71) Applicant: VAST DATA LTD., Tel Aviv (IL)

(72) Inventors: Kfir Gez, Tel Aviv (IL); Shai Katz, Tel Aviv (IL); Liron Efrati, Tel Aviv (IL); Morel Bara, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 114 days.

(21) Appl. No.: 18/820,190

(22) Filed: Aug. 29, 2024

(51) Int. Cl.
*G06T 11/00* (2026.01)
*G06F 9/451* (2018.01)
*G06T 3/40* (2006.01)
*G06T 11/26* (2026.01)

(52) U.S. Cl.
CPC .............. *G06T 11/26* (2026.01); *G06F 9/451* (2018.02); *G06T 3/40* (2013.01); *G06T 2200/24* (2013.01)

(58) Field of Classification Search
None
See application file for complete search history.

(56) References Cited

U.S. PATENT DOCUMENTS

2016/0328273 A1* 11/2016 Molka ...................... A61B 8/00
2019/0065078 A1* 2/2019 Yerfule ................ G06F 3/0685
2020/0045106 A1* 2/2020 Kumar ................ G06F 11/3485
2020/0051081 A1* 2/2020 Valecha ............... G06Q 20/401
2021/0216330 A1* 7/2021 Raghavan ........... G06F 9/44505
2023/0110285 A1* 4/2023 Pardo ...................... G06N 3/048 706/26
2023/0161483 A1* 5/2023 Kinsey .................. G06F 3/0619 714/763
2023/0236728 A1* 7/2023 Dong .................... G06F 3/0685 711/154
2023/0259292 A1* 8/2023 Keret ...................... G06F 3/067 711/154
2024/0264846 A1* 8/2024 Raghavan ........... G06F 9/44505

* cited by examiner

*Primary Examiner* — Martin Mushambo
(74) *Attorney, Agent, or Firm* — Reches Patents

(57) ABSTRACT

A method for dynamically displaying performance parameters of a group of clusters of one of more storage system related resources, the method includes executing for each cluster of the group of clusters: obtaining, by a graphical user interface controller, a first currently determined value of a first performance parameter that is selected out of a cluster bandwidth, a cluster latency and a cluster input output activity parameter; wherein the cluster is represented by a cluster graphical element that is orbited by one or more orbiting graphical elements; automatically converting, by the graphical user interface controller, the first currently determined value to a first graphical parameter that is a movement parameter of an orbiting graphical element; and automatically moving an orbiting graphical element of the one or more orbiting graphical elements according to the movement parameter.

19 Claims, 18 Drawing Sheets

DYNAMICALLY DISPLAYING PERFORMANCE PARAMETERS OF A GROUP OF STORAGE CLUSTERS

BACKGROUND

System administrators of storage systems are required to monitor storage systems so as to detect performance problems. Performance metrics need to be monitored so as to identify bottlenecks, and for optimizing system performance. Proactive monitoring is needed to prevent issues before they impact users.

When managing a large number of storage systems, a single screen cannot provide enough information regarding the storage system in a clear manner.

SUMMARY

There may be provided a method and system for dynamically displaying performance parameters of a group of clusters.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
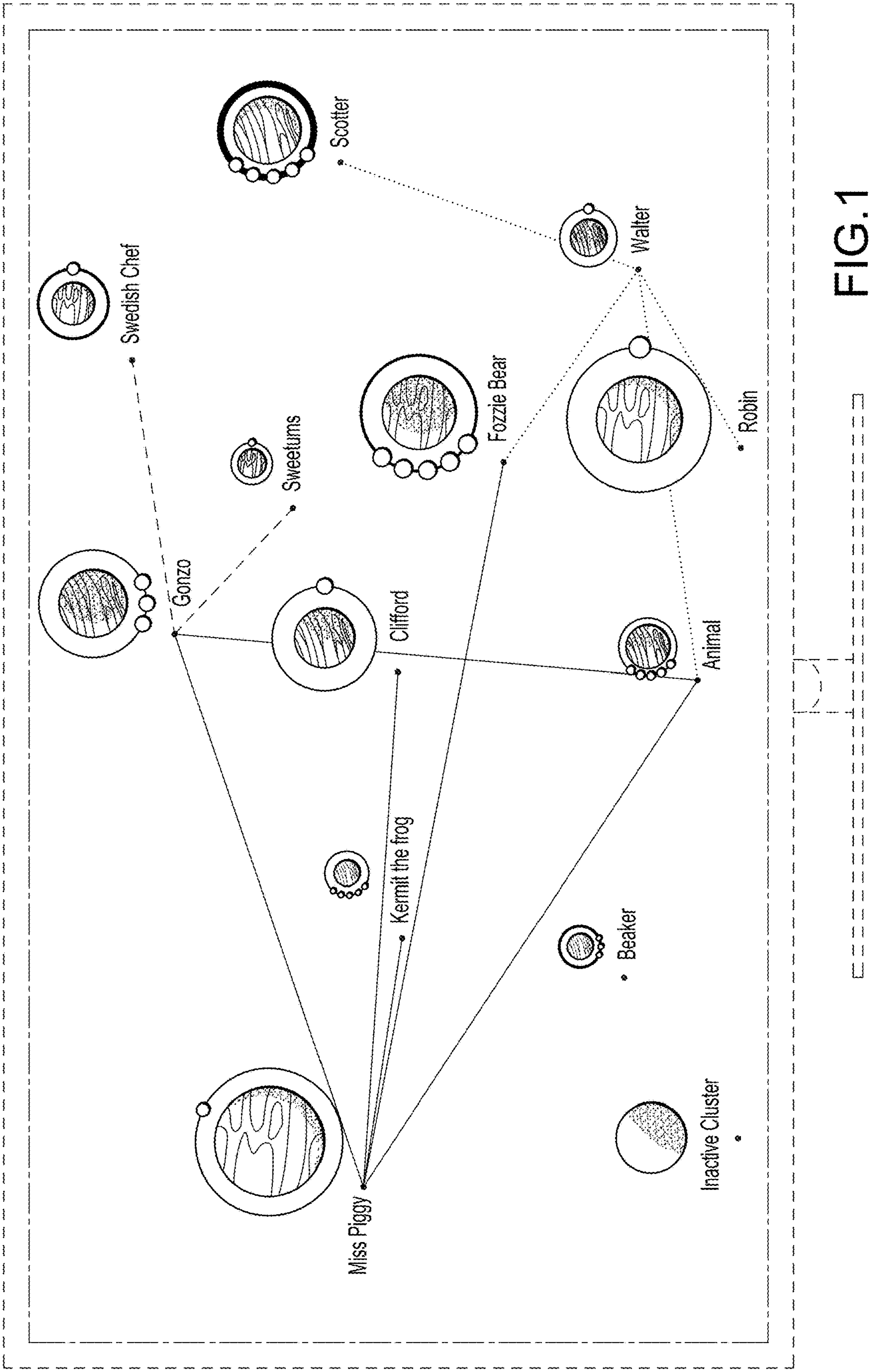
FIGS. 1-16 are examples of screenshots.

There is provides a solution for monitoring storage systems and even clusters of resources of one or more storage systems. Any reference to a storage system should be applied mutatis mutandis to a cluster of one of more storage system related resources.

A storage system may include one or more clusters of storage related resources. The storage related resources include storage nodes and compute nodes that manage the storage nodes, the incoming requests and the storage processes. The storage system, or the storage nodes and compute nodes of the storage system, are referred to as a cluster. A group of clusters may be connected, so as to provide a global namespace that can be accessed by a group of users connected to different clusters, and further for providing redundancy capabilities (e.g., replication). Different clusters are independent from each other in the sense that they are associated with one or more independently measured performance parameters that are selected out of a cluster bandwidth or throughput—the amount of data processed by the cluster per second, a cluster latency—the delay experienced by the clients of the cluster, from the time an access request is sent to the cluster until the response is received, and a cluster input output activity parameter (IOPS, IO per second).

These performance parameters may be independently affected, either by the system limitations and/or by the behavior of the client's applications. It may be that the throughput is low, but the IOPS is high, because the client sent multitude small write requests, or because of the way the system handles write requests. It may be also that the latency is bad (high) even though the throughput is high.

Therefore, the system administrator needs to have quick access to all the performance parameters of the storage system.

When the data center managed by the system administrator includes multitude storage systems, the management screen, that displays the overall status of the multitude storage systems, may become overloaded with the complex displayed information and may cause distraction and difficulties for the administrator to focus and spot the bottlenecks.

On the other hand, in a case where only a general indication of performance issues is presented per system, the system administrator may be required to zoom into the icon of the storage system that presents a general performance issue.

Therefore, there is a need to reflect various performance issues and statuses per storage system, on the main display that presents all the systems of interest, without needing to zoom into another screen for more specific details, while avoiding an overload of information on the main display.

The following methods provides a visual and clear presentation of a complex status of multiple storage systems of a set of storage systems of interest (that may provide a global namespace), including: the size, fullness and current performance parameters, without needing to zoom into a storage system of the set, in order to obtain these information details.

The system administrator is able to obtain the full status and the performance parameters of each and all storage systems from a single GUI screen of a management station, at a glance.

The management system orchestrates the multiple storage systems of the set, and determines the current status parameters of each storage system, particularly the current performance parameters, such as: bandwidth, IOPS and latency. In addition, the management system may obtain the size of each storage system, e.g., how much storage is included in the storage system. The management system may further determine the type of each storage system, e.g., a cloud system or an on-premises system. The management system may further determine the fullness of each system, i.e., how much of the storage space is occupied by data or how much is a free space. The management system may further determine the type of connections between any storage to others storage systems, e.g., a replication connection and/or global storage sharing between any two systems (when two systems can provide access, by a user connected to any system, to parts of the same file or directory, or any other filesystem entity, wherein different parts of a file or directory may be stored in any one of the connected systems).

The management system may constantly or periodically monitor or otherwise acquire information from the storage systems and may accumulate information related to performance parameters.

The management system may determine the level of each performance parameter at any point in time, and may display a dynamically changed screen for the current performance parameters of all the systems of interest. For example, it may determine whether the bandwidth of the storage system is categorized as low, medium or high, whether the latency is short, medium or long, and whether the number of IOPS is small, medium or large. The management system may use more than three levels to categorize each parameter.

The performance levels may differ from one storage system to another. For example, a system with high compute resources and/or large storage capacity may be associated with different levels of the performance parameters comparing to a system with limited resources. The levels are relative to the maximum abilities of the storage system as dictated by its hardware components. For example, for a system with vast resources, a top level of IOPS may be defined as over one or more millions IOPS, while a top IOPS level of a system with limited resources may be defined as only hundreds of thousands of IOPS.

The management system may obtain, via the network, the hardware parameters of each storage system, for example, the number and type of compute nodes, the capacity of storage space and the type of the storage devices. According to the hardware parameters of a specific storage system, the management system can determine the maximum limits of performance expected from the specific storage system, e.g., the maximum IOPS and maximum bandwidth. The levels pf each performance parameter can be determined relative to the maximum performance limit of the performance parameter of the specific storage system. For example, if the current IOPS or the bandwidth parameter of the specific storage system is below a first fraction (e.g., 30%) of the maximum limit of the system with regard to the respective performance parameter, then the level of the performance parameter is determined as low. If the current value of the performance parameter is above a second fraction (e.g., 70%) of the maximum limit of the system with regard to the respective performance parameter, then the level of the performance parameter is determined as high. For any other value between the first and second fraction—the performance parameter is considered as medium.

Each storage system may be displayed as a planet. There may be more than one type of planet icons, for example, one type of planet icon illustrates a storage system that is part of a cloud, and a second type of planet icon illustrates a storage system that is an on-premises system. The size of the planet (i.e., the radius) may indicate the storage capacity of the storage system. The fullness of the storage space of each system may be illustrated as an eclipse. The percentage of the free space corresponds to the percentage of the eclipse shadow out of the planet face, e.g., a larger eclipse indicates more free space, an eclipse that covers a third of the planet face indicates that a third of the storage space is free. Alternatively, the eclipse may represent the full storage space.

Each planet is further displayed as having moons and an orbit of the moons that circle around the planet. The moons and orbit present the levels of different performance parameters.

The performance parameters are reflected in the display as visual moon parameters. The moon parameters may include: the thickness of the orbital ring, the number of the moons, and the orbiting speed in which the moons orbit the planet.

The presentation of each performance parameter is selected from the visual moon parameters. For example, the level of the bandwidth, e.g., high, medium and low bandwidth, may be reflected by the orbiting speed of the moons, e.g., high bandwidth corresponds to a high speed and lower bandwidth corresponds to lower speed. The level of the latency, e.g., long, medium and short latency, may be reflected by the thickness of the Orbit's ring, e.g., thick, medium and thin ring. The level of the IOPS, e.g., high, medium and low number of IOPS may be reflected by the number of moons that orbit a planet.

FIG. 1 illustrates a constellation with multiple planets wherein each planet represents a storage system (a cluster of storage related resources). Two types of planets indicate two types of storage systems, represented by different planet patterns. For example, planets named Miss Piggy, Swedish Chef, Sweetums, Fozzie Bear and Robin indicate on-premises storage systems and planets named Kermit the frog, Beaker, Animal, Walter, Scooter and Clifford indicate cloud storage systems.

The different planets are partially eclipsed—for example Fozzie Bear and Gonzo are illustrated as being under a broad eclipse (represented by a darker area that fills the planet face), e.g., 75% of the planet face, to indicate that most (e.g., 75%) of its storage space is free. Other planets, such as Scotter and Robin are barely eclipsed—and illustrate storage systems that are full. Alternatively, the eclipse may represent the size of the full storage space.

Fozzie Bear, Scooter and Animal, each with five moons to indicates that currently, these systems serve a large number of IOPS, comparing to their maximum limits of IOPS. The number of moons represents the IOPS level, wherein more moons represent high IOPS. Scooter has a thicker orbital ring comparing to Fozzie bear, indicating that the latency experienced by users of the storage system represented by Scooter is longer than the latency of the storage system represented by Fozzie Bear. A thicker orbit represents a longer/higher latency.

Gonzo and Beaker have three moons to indicate that currently, these systems serve a medium number of IOPS, comparing to their maximum limits of IOPS.

Miss Piggy, Swedish Chef, Sweetums, Walter and Robin have only a single moon to indicate that currently, these systems serve a low number of IOPS, comparing to their maximum limits of IOPS.

Miss Piggy is the largest planet-indicating that is has the largest storage capacity of all storage systems. Beaker, Sweetums and Kermit the frog are the smallest planets-indicating that they have the smallest storage capacity of all storage systems.

FIG. 1 also illustrates an inactive cluster that does not have any moon or orbit.

FIG. 1 also illustrates a first type of linkage (illustrated by a continuous line) between Miss Piggy, Gonzo, Kermit the Frog, Clifford, Animal, a second type of linkage (illustrated as a dashed line) between Gonzo, Swedish Chef and Sweetums, and a third type of linkage (dotted line) between Walter, Scooter, Robin, Anima and Fozzie Bear. The continuous line may represent a replication relationship, the dashed lines may represent systems that provide a shared global name space.

Figure 6:
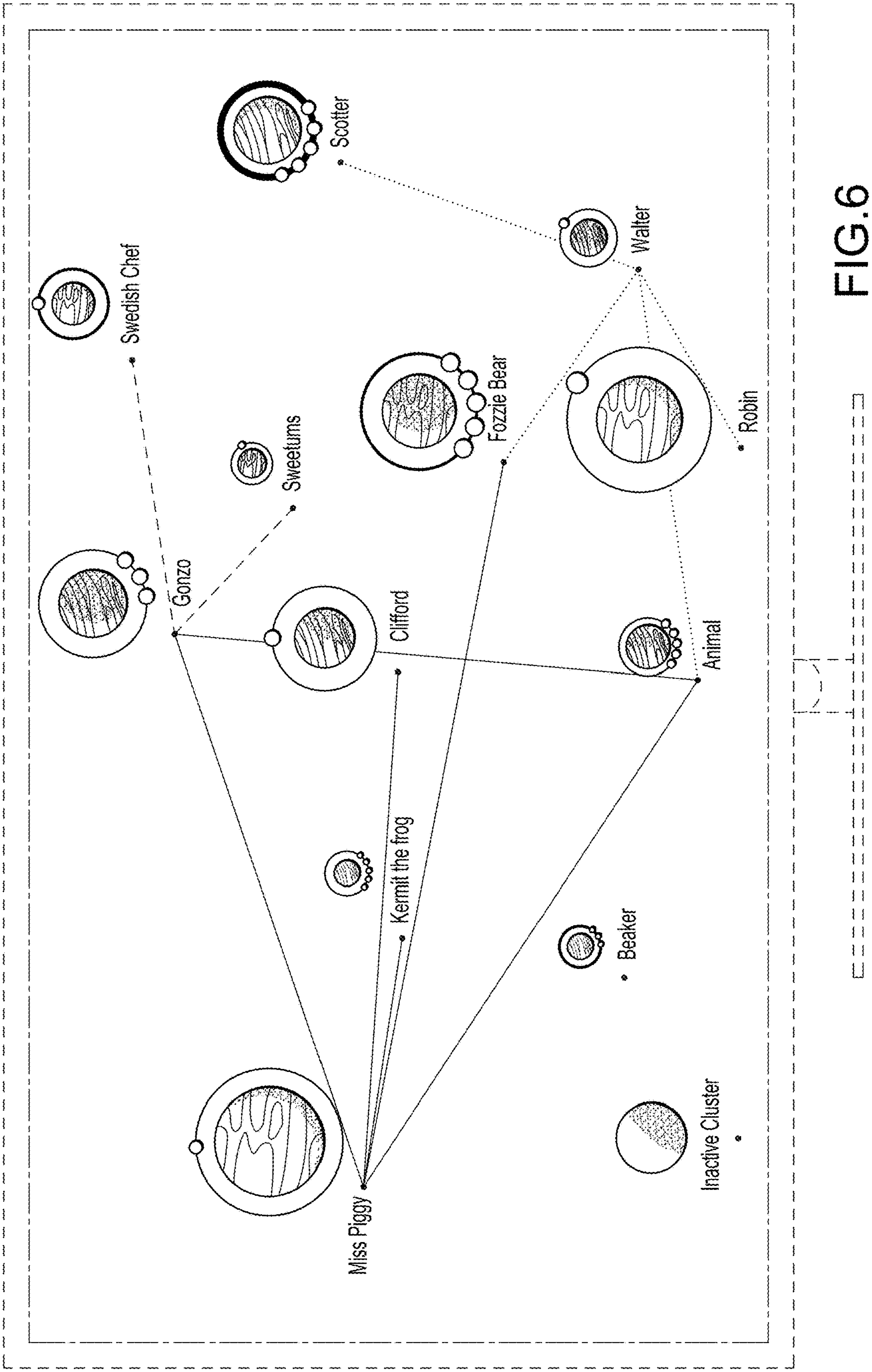

FIG. 1 illustrates the status at a first point in time while FIG. 6 illustrates the status at a second point in time, a comparison between FIG. 1 and FIG. 6 illustrates differences in the angular position of the moons—which is indicative of differences in the orbit speed of the moons of different planets. For example—angular position of the moon(s) of Miss Piggy, Beaker, Gonzo Sweetsums changed by 30 degrees, angular position of the moon(s) of Scotter, Walter and Robin changed by 60 degrees, and the angular position of the moon(s) of other planets changed by 90 degrees-indicative of different orbiting speeds.

Figure 2:
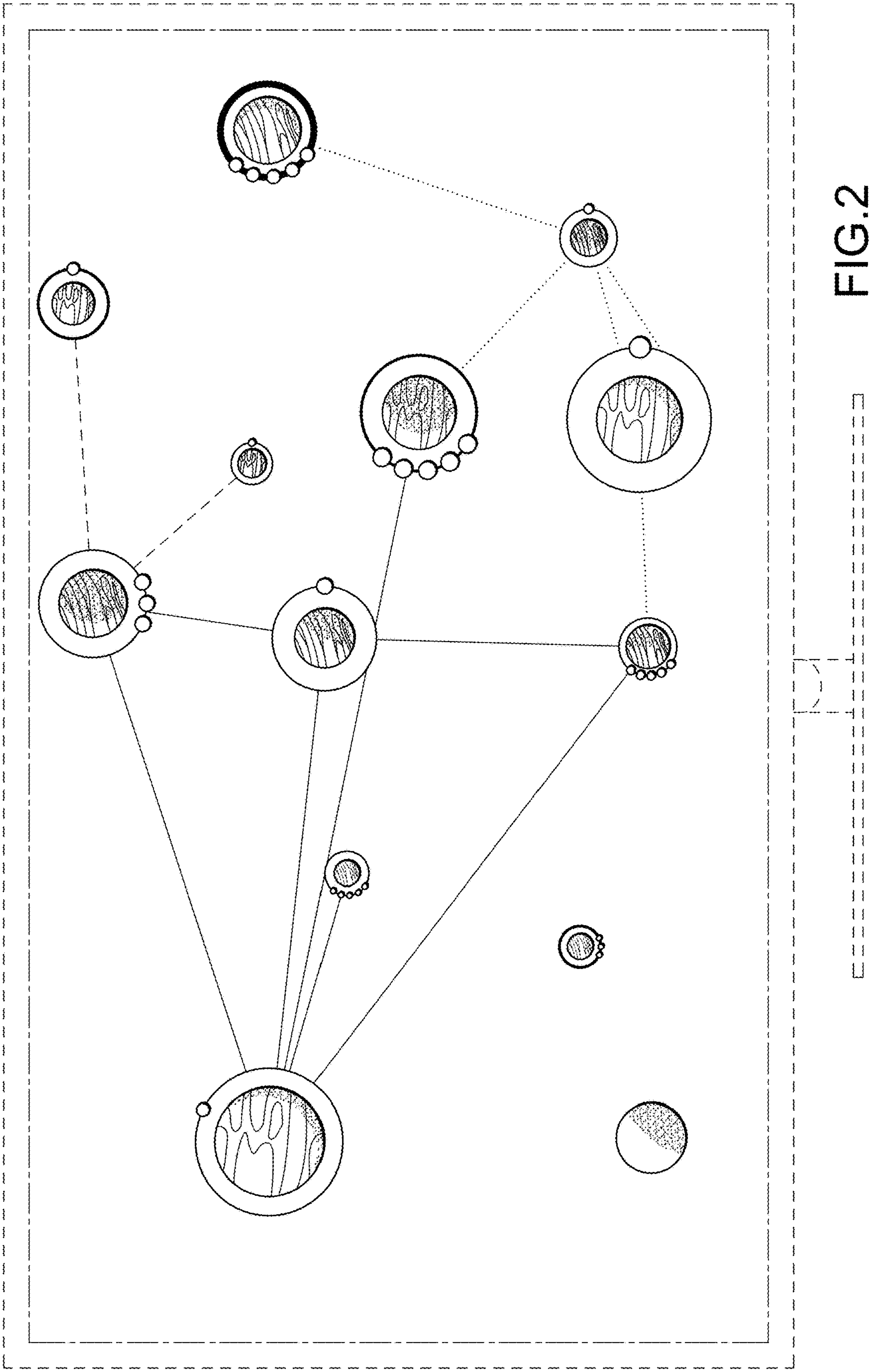

FIG. 2 illustrates an example in which the names of the planets are not displayed.

Figure 3:
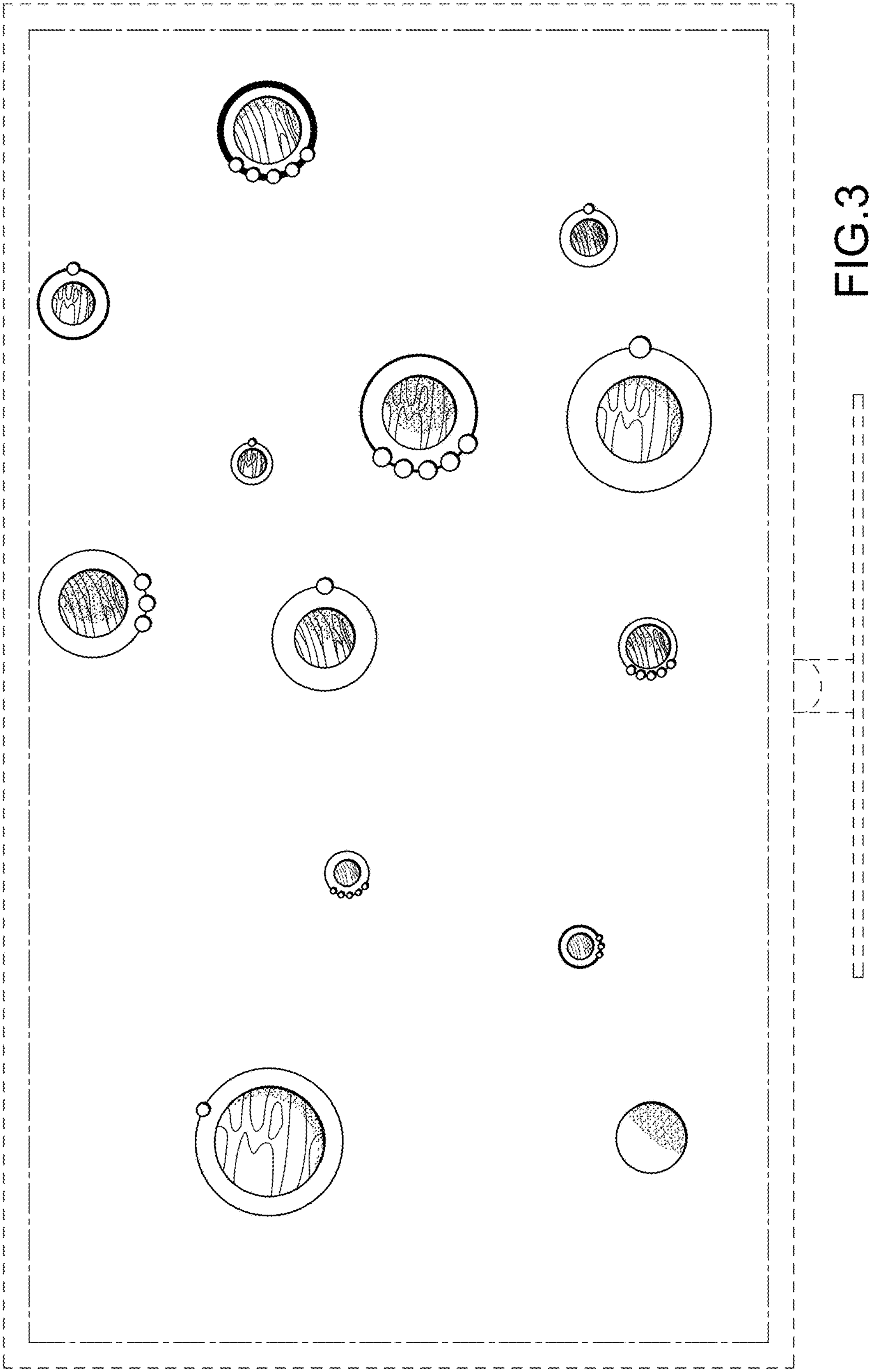

FIG. 3 illustrates an example in which the names of the planets and lines linking the planets are not displayed, which may represent a group of systems of interest that are not connected, but still supervised by the same management system.

Figure 4:
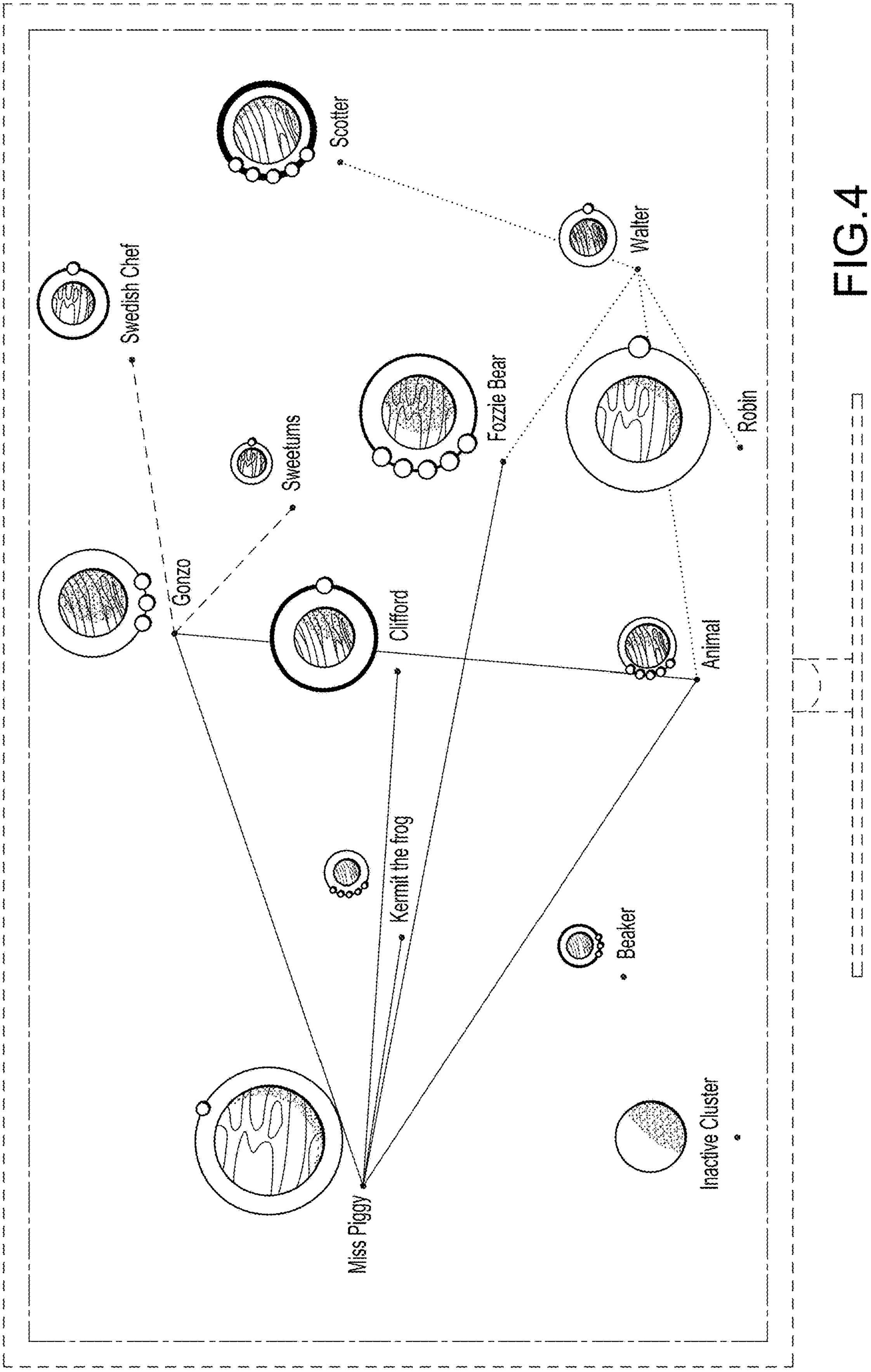

FIG. 4 illustrates an example in which one or more parameters of the storage systems have changed (in comparison to those illustrated in FIG. 1)—for example, the thickness of the orbit related to Clifford has increased—indicative of an increase of latency.

Figure 5:
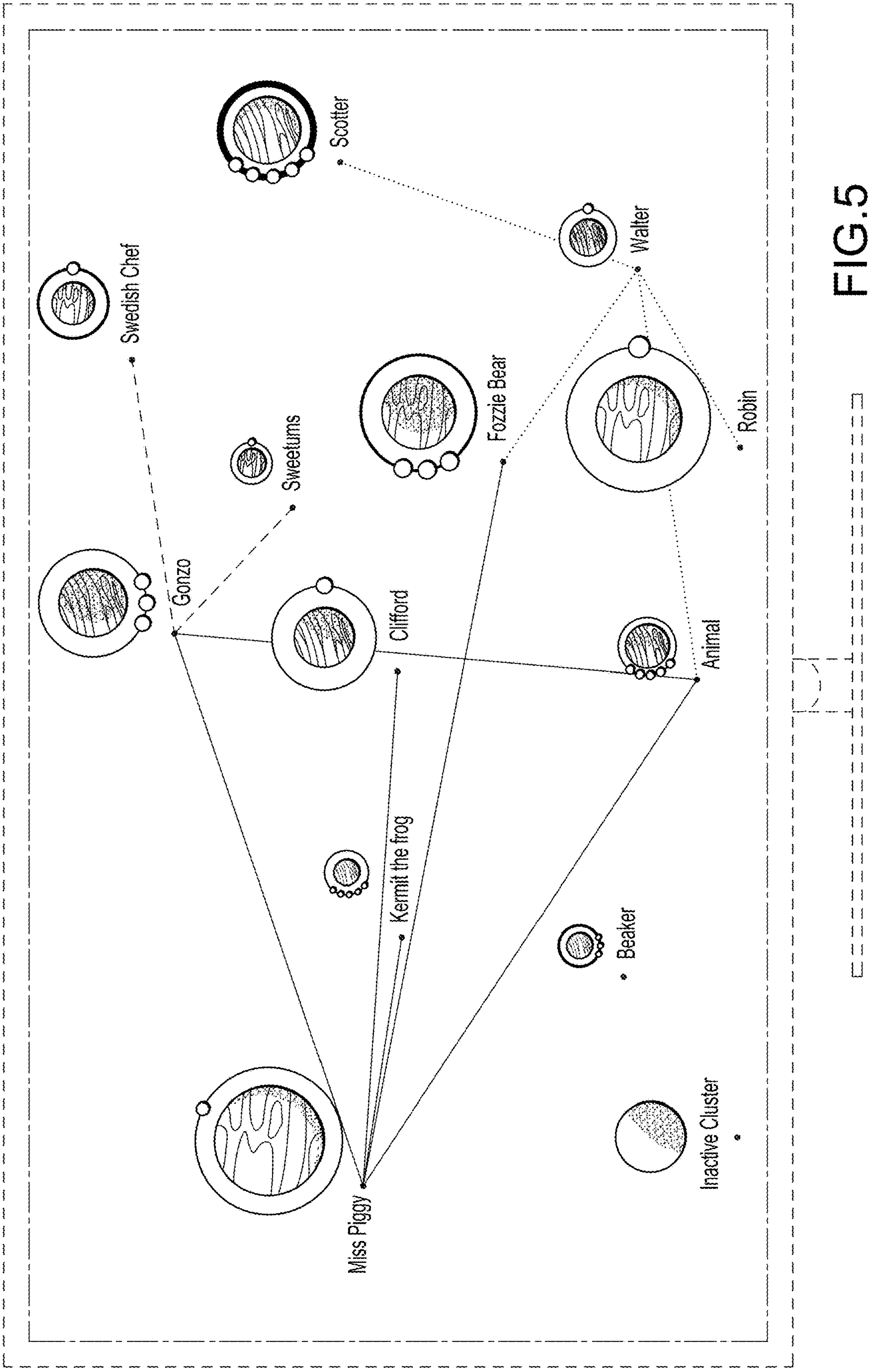

FIG. 5 illustrates an example in which one or more parameters of the storage systems have changed (in comparison to those illustrated in FIG. 1)—for example, the number of moons of Fozzie bear has changes from five to three-indicative of decrease of IOPS, comparing to its maximum limits of IOPS—from large to medium.

Figure 7:
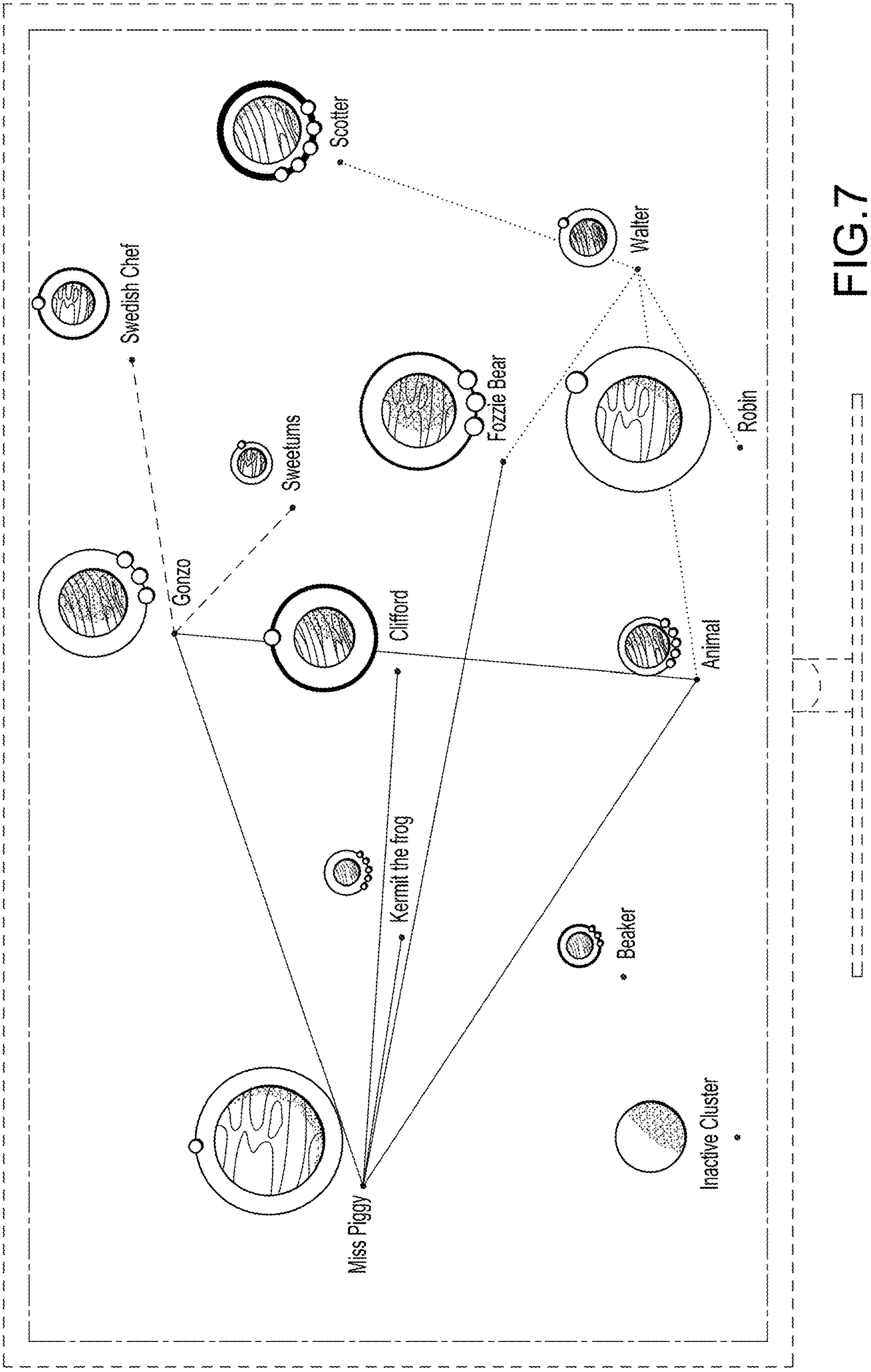

FIG. 7 illustrates an example in which one or more parameters of the storage systems have changed (in comparison to those illustrated in FIG. 1)—for example the thickness of the orbit related to Clifford has increased, the number of moons of Fozzie Bear has decreases. FIG. 7 was also taken at a different point of time than FIG. 1 and a comparison between FIG. 1 and FIG. 7 illustrates differences in the angular position of the moons—and it indicative of differences in the orbit speed of the moons of different planets, indicating a change in the bandwidth.

Figure 8:
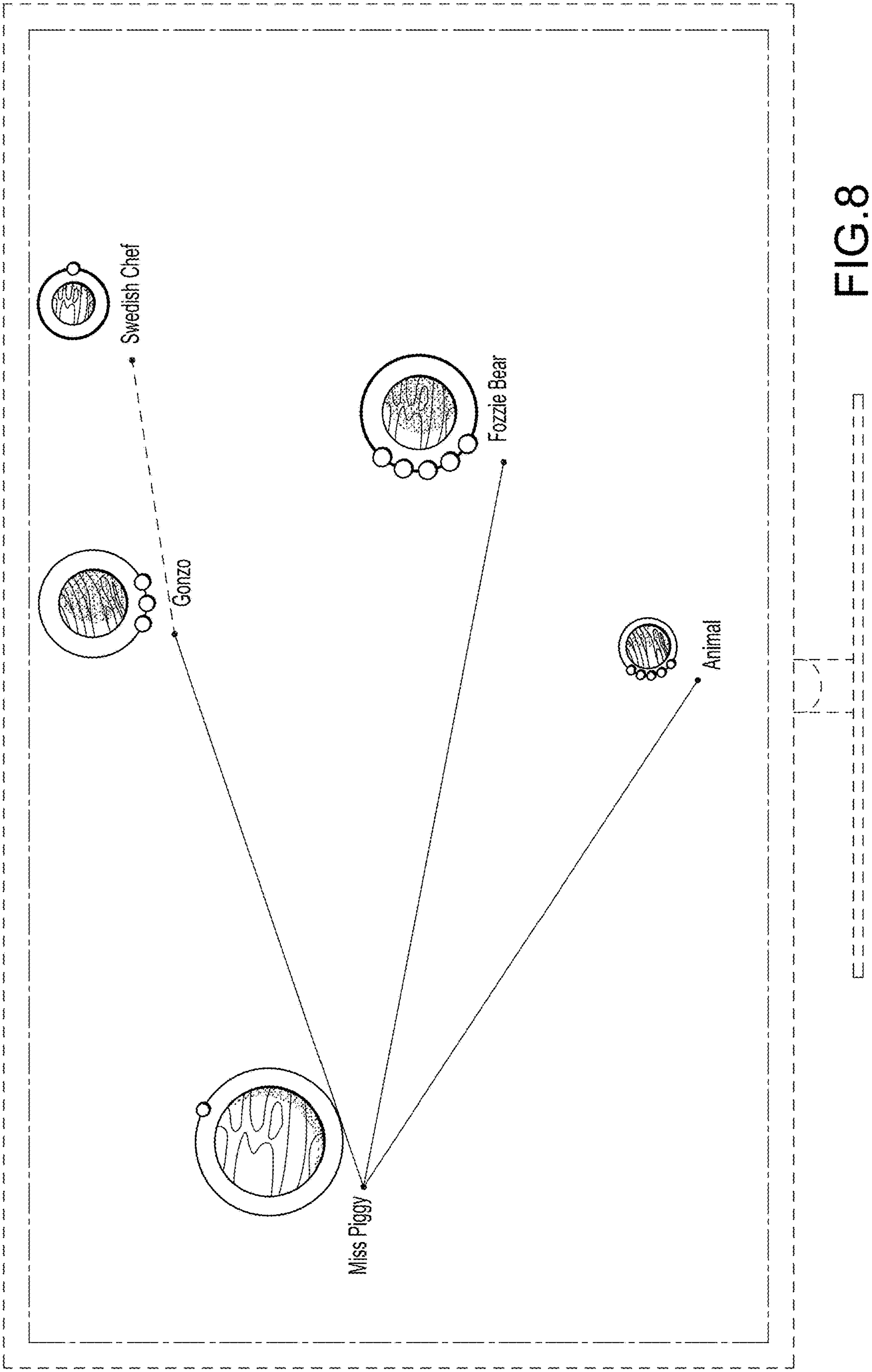
Figure 9:
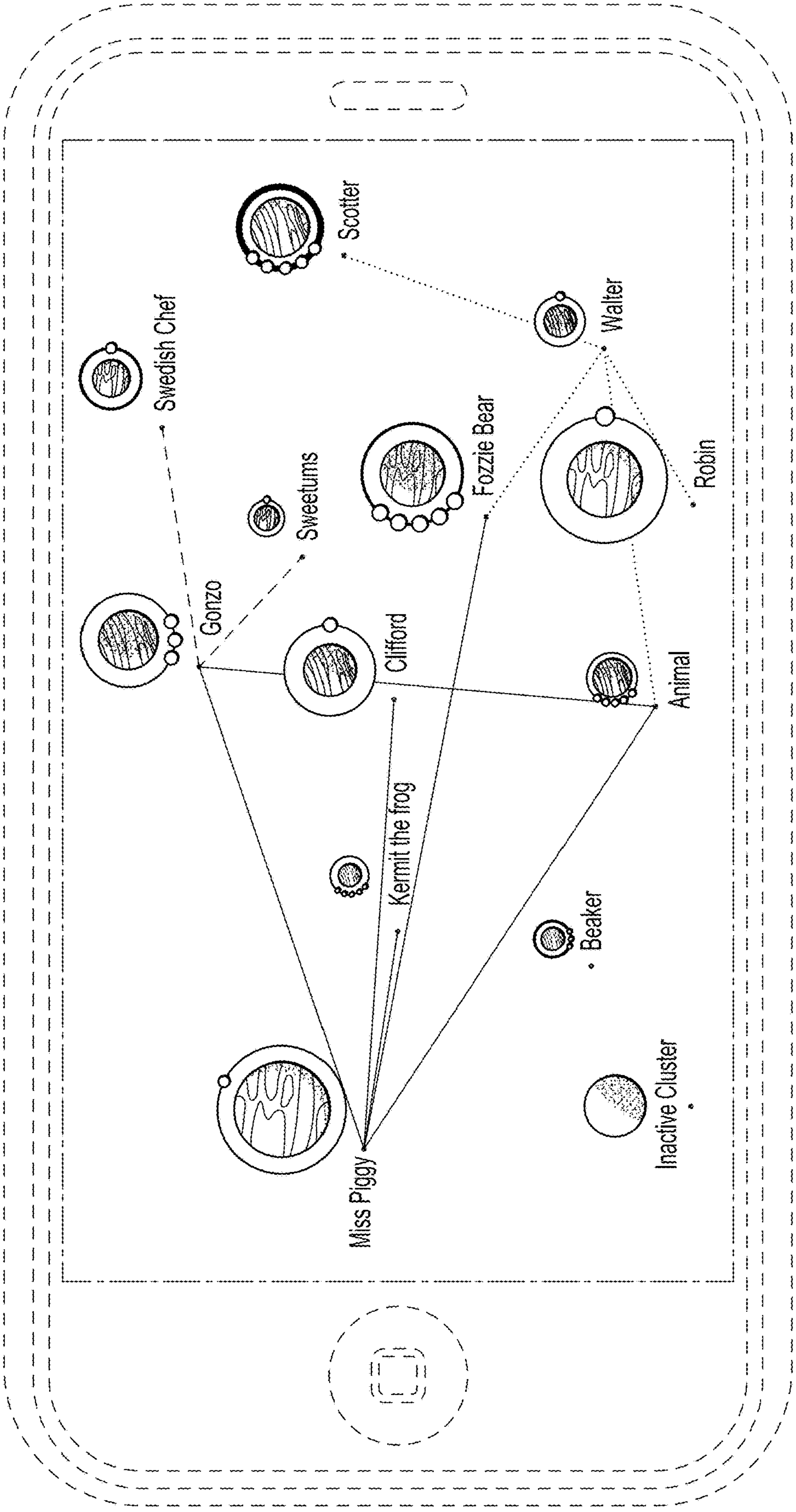
Figure 10:
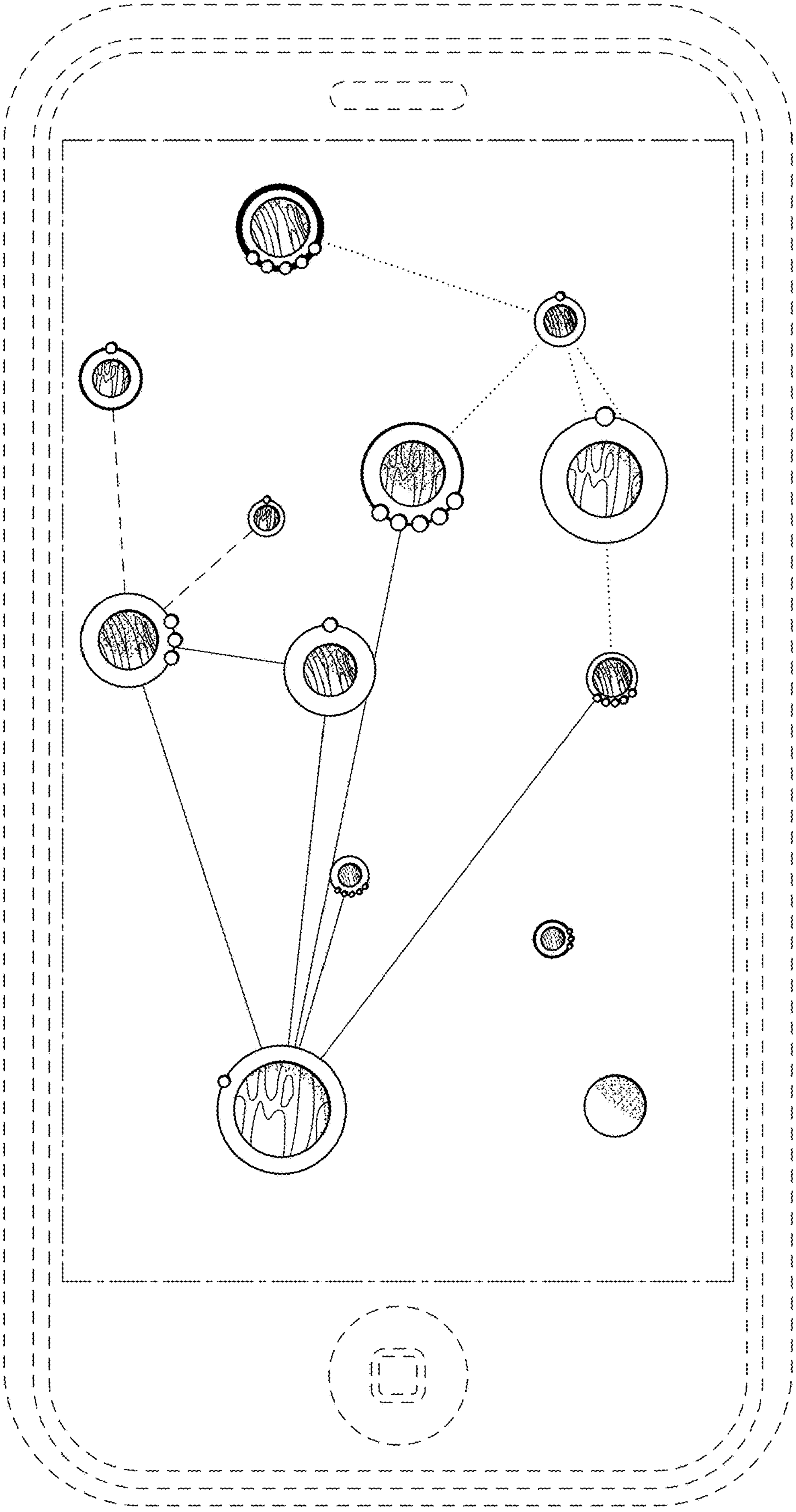
Figure 11:
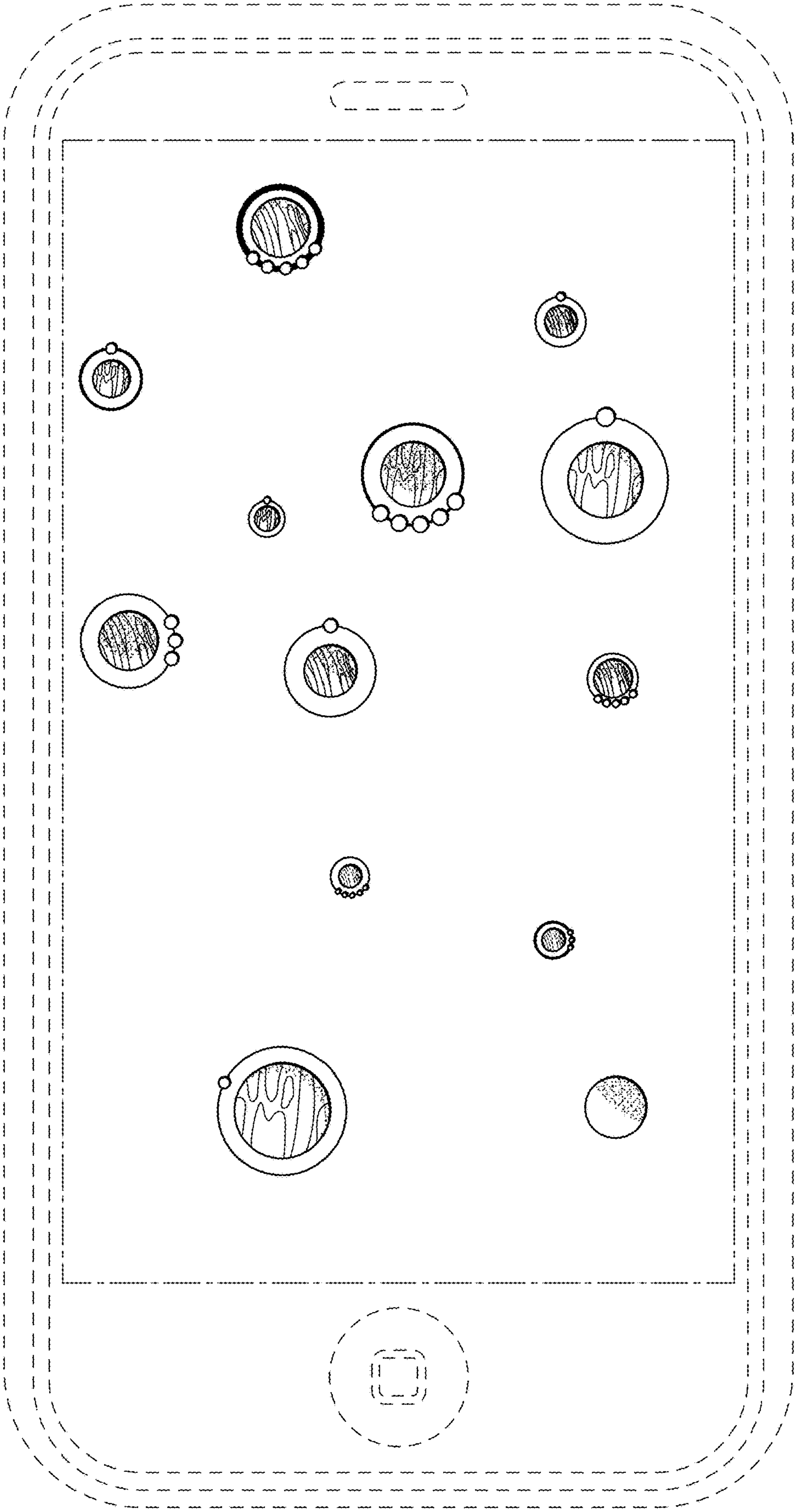
Figure 12:
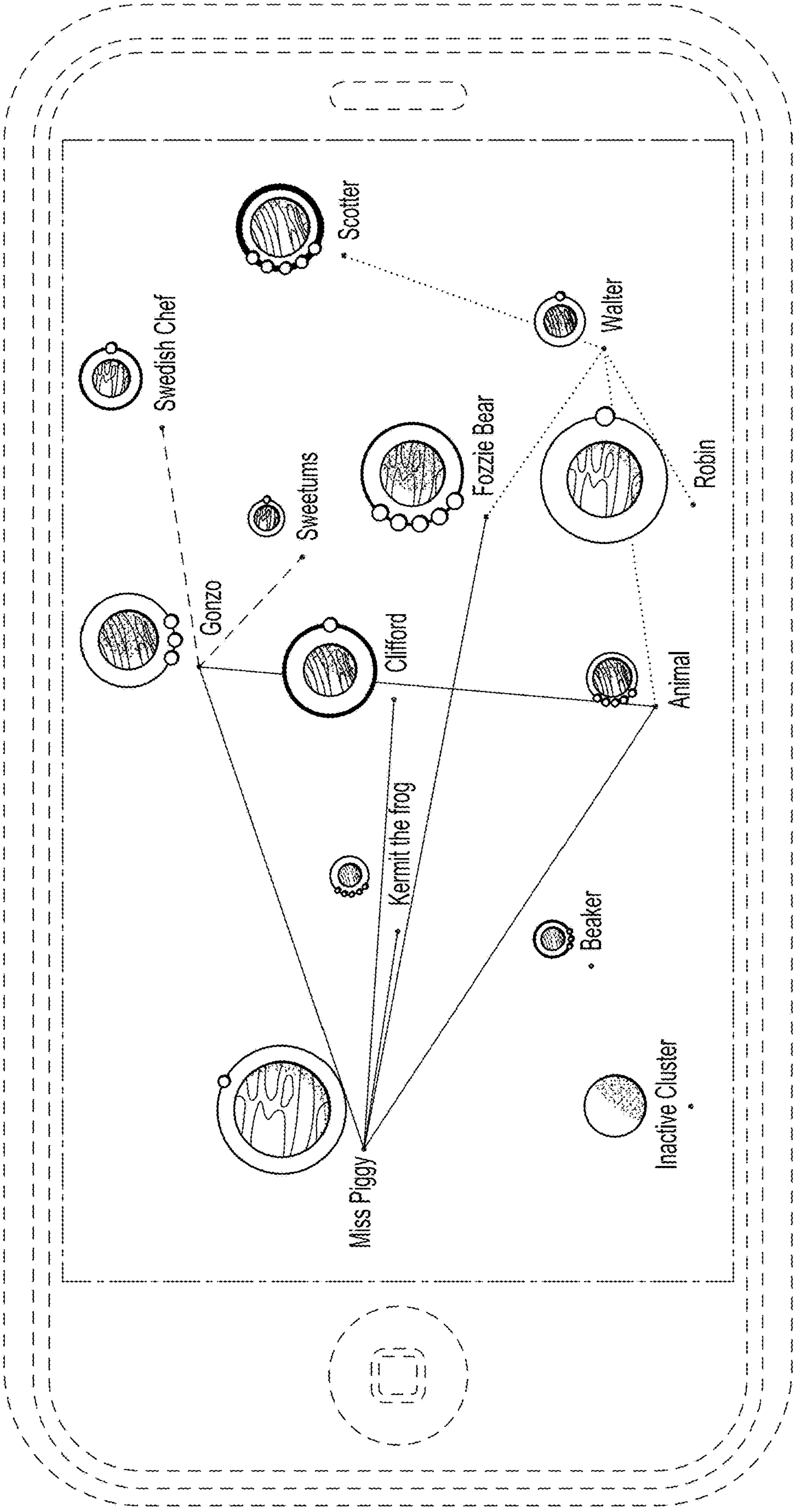
Figure 13:
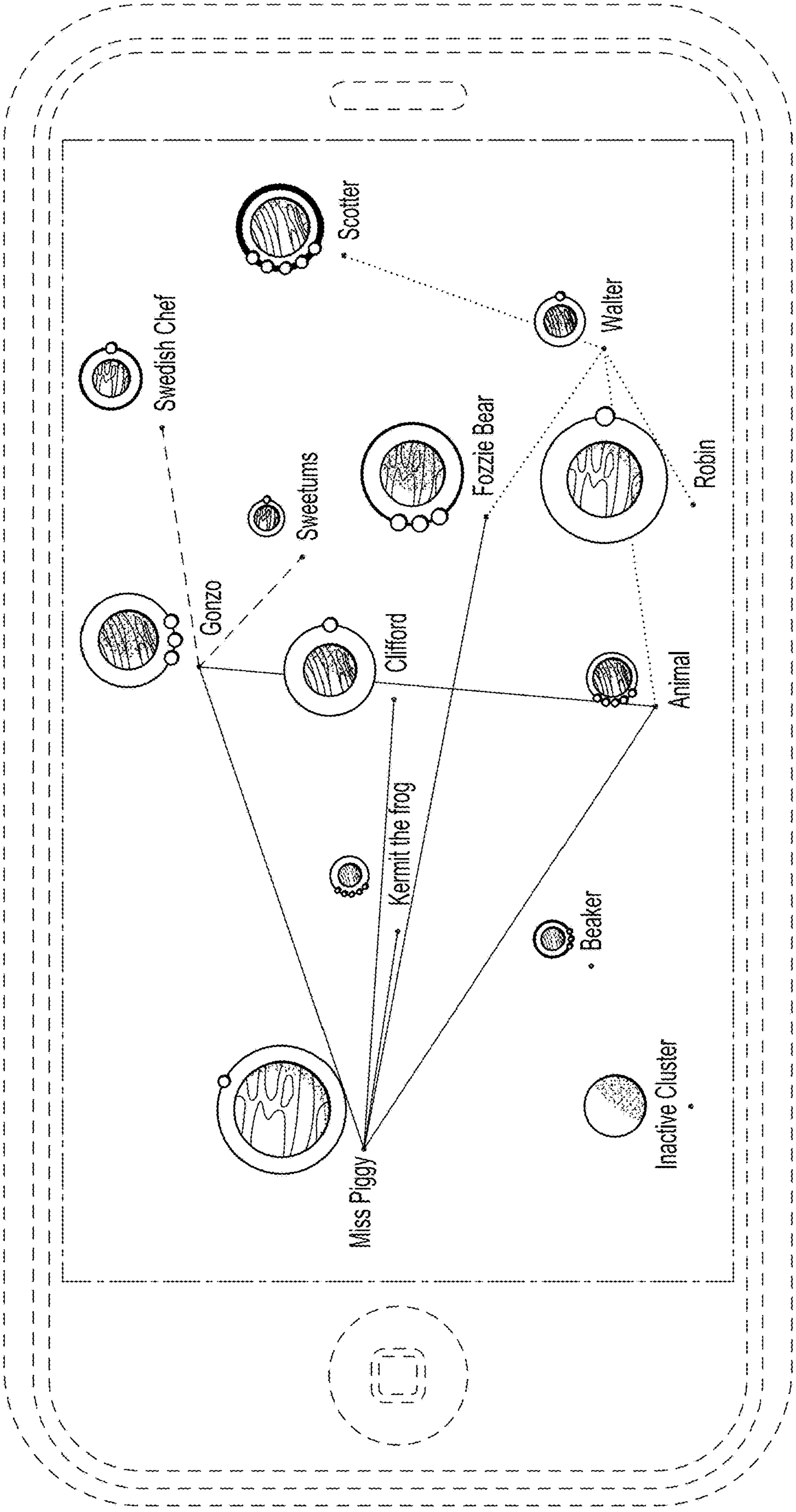
Figure 14:
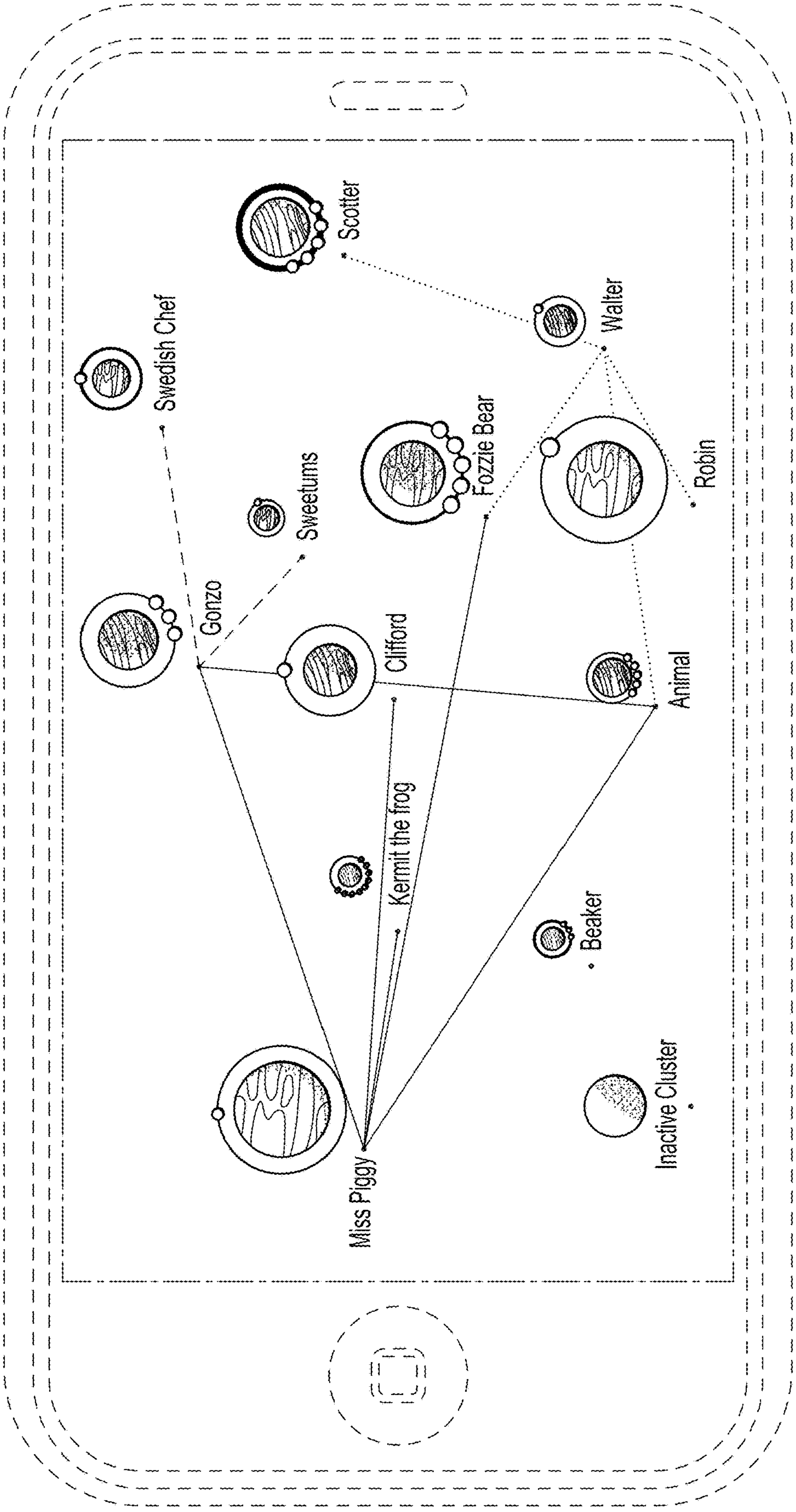
Figure 15:
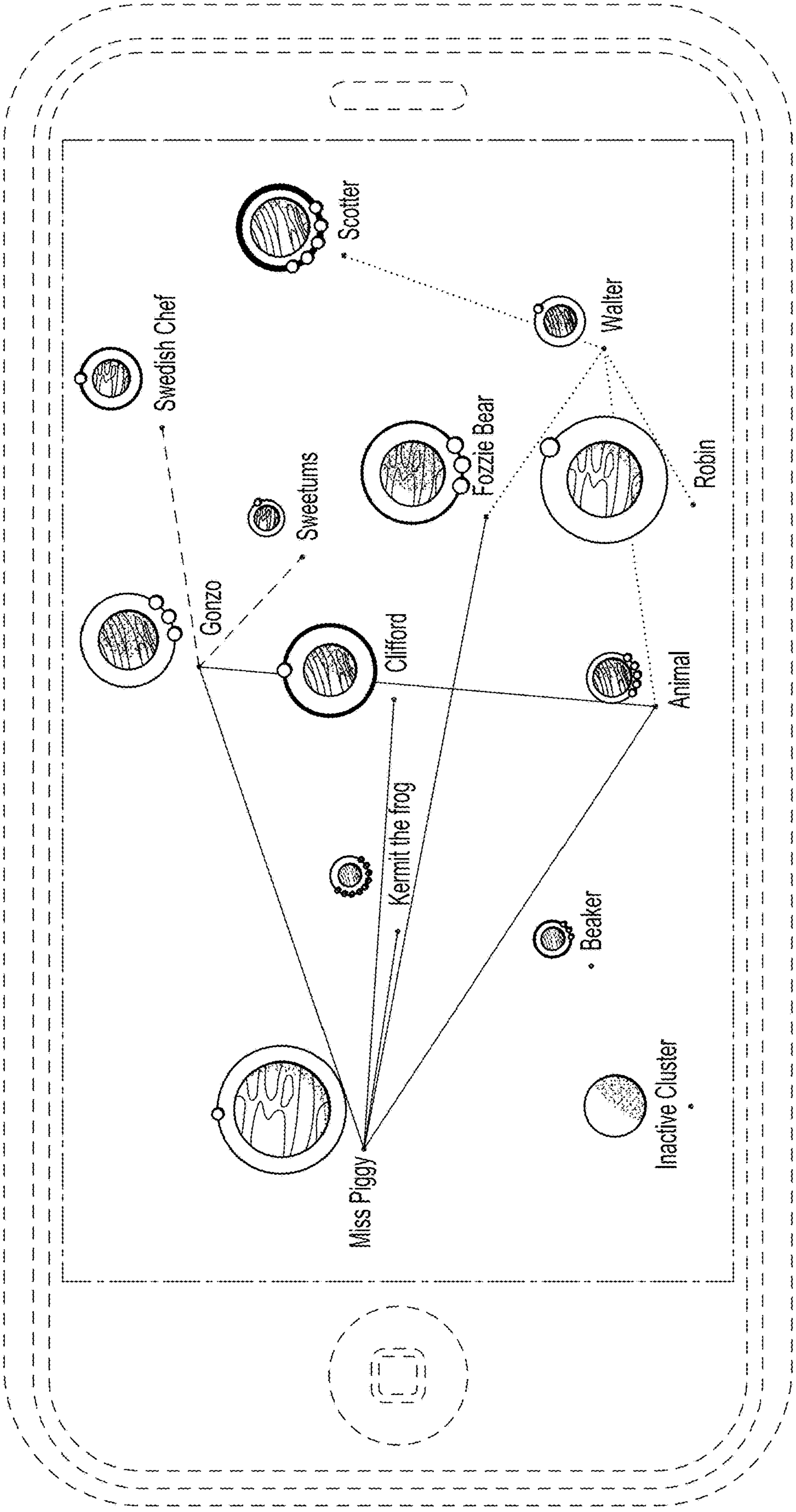
Figure 16:
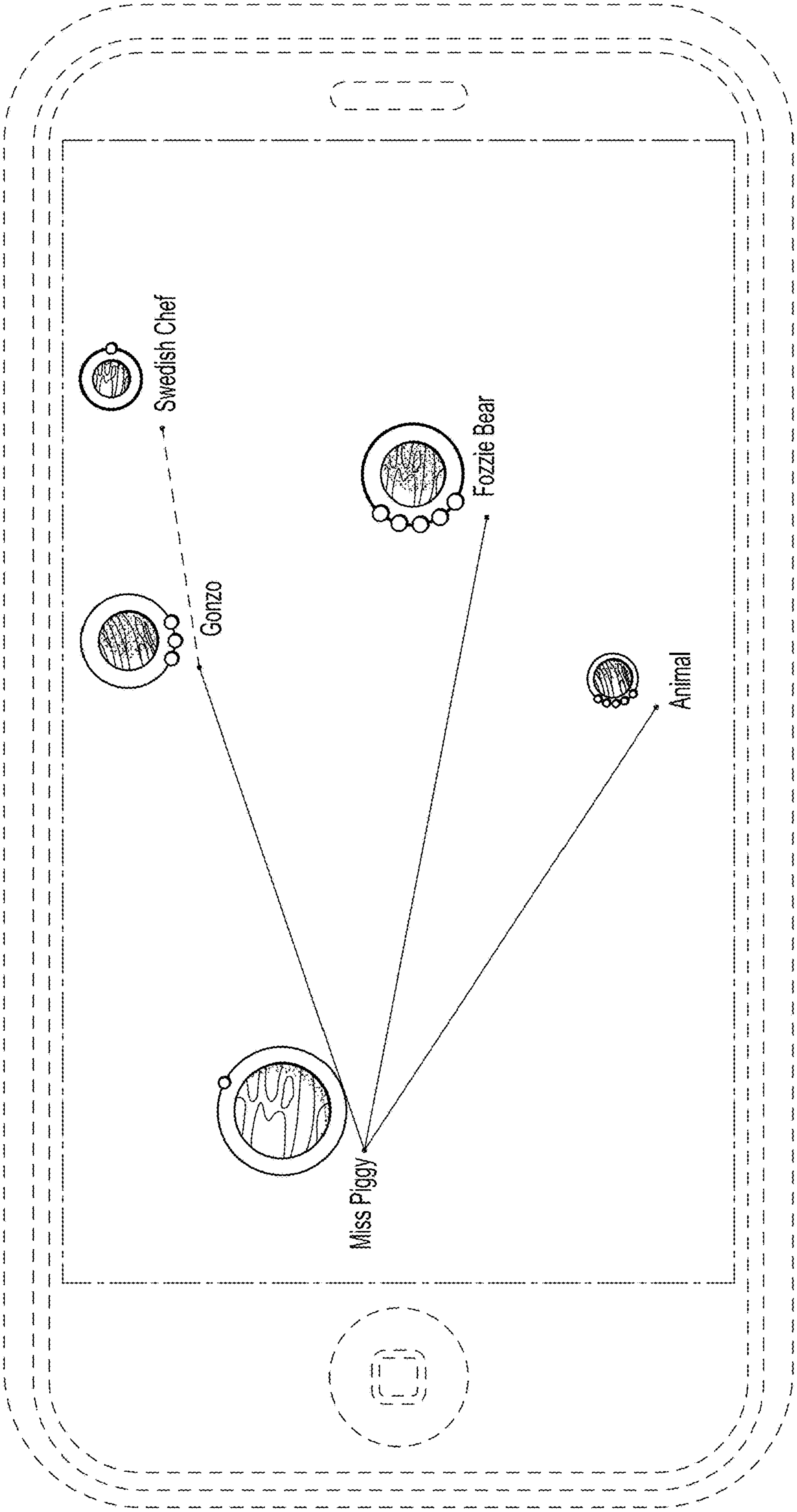

FIG. 8 illustrates a scenario in which fewer storage systems are monitored (in comparison to FIG. 1)—such as planets Miss Piggy, Gonzo, Swedish Chef, Fozzie Bear and Animal. Other storage systems may be idle—or may not be currently monitored.

While FIGS. 1-8 illustrates a GUI that is a display of a computer, FIGS. 9-16 illustrate a GUI that is a mobile phone.

The number of the clusters may change over time and may range between 2-20, 5-50, and more.

Figure 17:
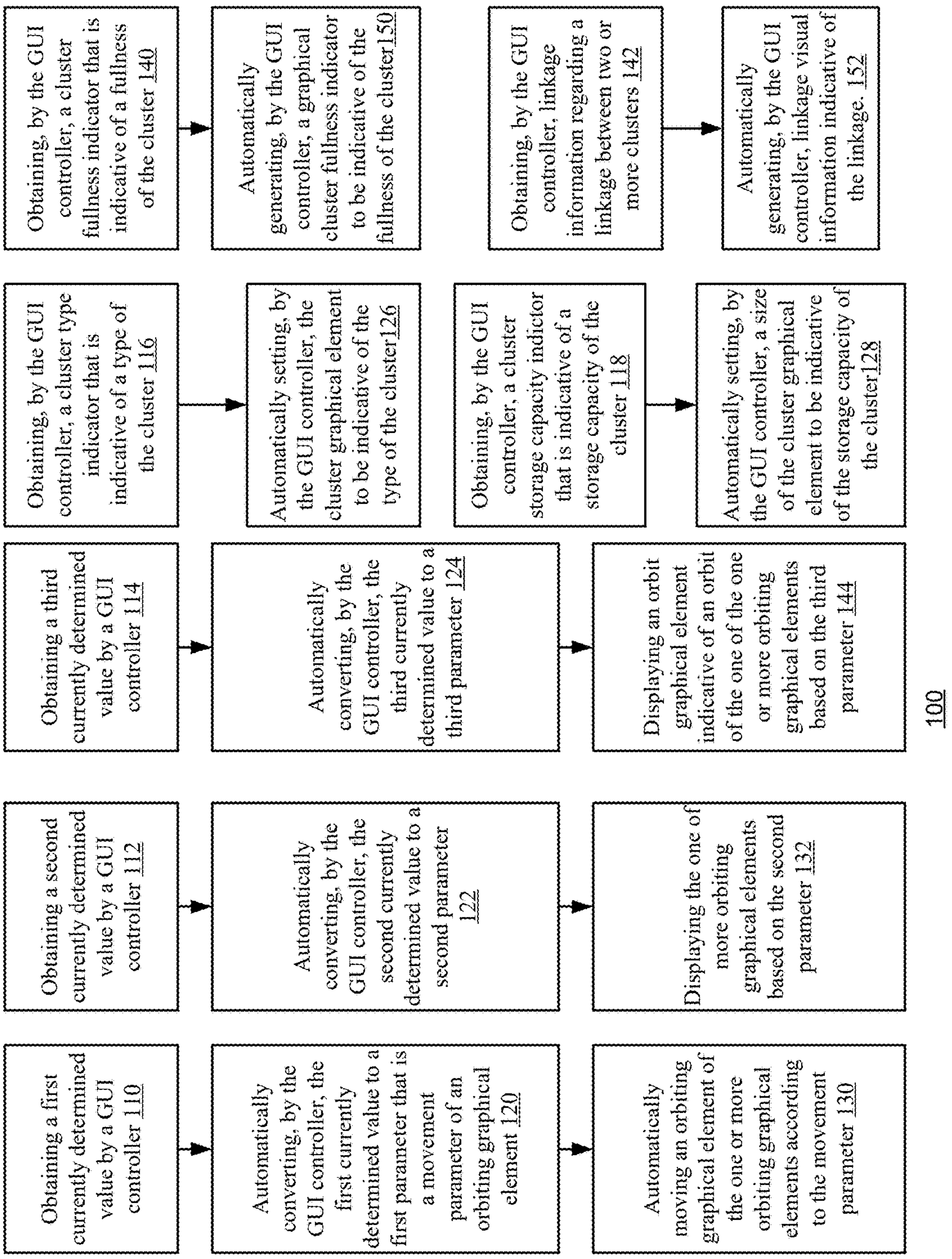
FIG. 17 is an example of a method.

FIG. 17 illustrates a method 100 for dynamically displaying performance parameters of a group of clusters of one of more storage related resources.

For simplicity of explanation the following text refers to a cluster, whereas any reference to a cluster should be applied mutatis mutandis to a storage system.

According to an embodiment, method 100 is executed for each cluster of the group of clusters. The group of cluster may change over time and includes clusters that are currently monitored and have their performance related data displayed.

According to an embodiment, method 100 includes obtaining, by a graphical user interface (GUI) controller, a first currently determined value of a first performance parameter that is selected out of a cluster bandwidth, a cluster latency and a cluster input output activity parameter; wherein each cluster of the at least one cluster is represented by a cluster graphical element (e.g., a planet) that is being orbited by one or more orbiting graphical elements (e.g., moons and an orbit).

According to an embodiment, step 110 includes obtaining, by the GUI controller, the first currently determined value.

According to an embodiment, step 110 includes determining the first currently determined value by the graphical user interface controller. The determining may include processing an outcome of a monitoring process to determine the first currently determined value. The monitoring process may include constantly or periodically reading or receiving values related to data traffic entering or exiting the cluster, e.g., counting or reading IO per second, accumulating sizes of data of write requests and/or read responses within a time unit (second or smaller), accumulating latencies of outgoing responses during a time unit (a second or less). The determining further includes calculating a moving average of the first currently determined value, based on historic values that were determined during a time window that preceded the determining (e.g., the recent 10 seconds, 30 seconds). The determining may further include obtaining hardware characteristics of the cluster, e.g., the current number of storage devices, their sizes and type and the number and types of the compute entities (resources).

According to an embodiment, step 110 is followed by step 120 of automatically converting, by the graphical user interface controller, the first currently determined value to a first graphical parameter that is a movement parameter of an orbiting graphical element. The converting may include determining the level of the first currently determined value, based on the hardware characteristics of the cluster, e.g., whether the level is low, medium or high, or determining the score of the first currently determined value among a set of scores (e.g., 1-10), based on the hardware characteristics. The score is then converted to a movement parameter (e.g., the speed of the orbiting).

According to an embodiment, step 120 is followed by step 130 of automatically moving an orbiting graphical element of the one or more orbiting graphical elements according to the movement parameter.

According to an embodiment, the movement parameter is an orbiting speed of the orbiting graphical element, e.g., high, medium, low speed, or a speed level out of a number of speed levels. According to an embodiment, the moving includes rotating the orbiting graphical element (e.g., a moon) around the planet according to the orbiting speed.

According to an embodiment method 100 further includes:

a. Step 112 of obtaining by the graphical user interface, a second currently determined value of a second performance parameter that differs from the first performance parameter and is selected out of the cluster bandwidth, the cluster latency and the cluster input output activity parameter.
b. Step 122 of automatically converting, by the graphical user interface controller, the second currently determined value to a second graphical parameter that differs from the first graphical parameter.
c. Step 132 further includes displaying the one or more orbiting graphical elements based on the second graphical parameter.

According to an embodiment, the second graphical parameter is a number of the one or more orbiting graphical elements.

According to an embodiment method 100 further includes:

a. Step 114 of receiving by the graphical user interface, a third currently determined value of a third performance parameter that differs from each one of the first performance parameter and the second performance parameter, and is selected out of the cluster bandwidth, the cluster latency and the cluster input output activity parameter.
b. Step 124 of automatically converting, by the graphical user interface controller, the third currently determined value to a third graphical parameter that differs from each one the first graphical parameter and the second graphical parameter.
c. Step 134 of displaying an orbit graphical element indicative of an orbit of the one of the one or more orbiting graphical elements based on the third graphical parameter.

According to an embodiment, the third graphical parameter is a thickness of the orbit graphical element.

According to an embodiment, method 100 further includes:

a. Step 116 of obtaining, by the graphical user interface controller, a cluster type indicator that is indicative of a type of the cluster.
b. Step 126 of automatically setting, by the graphical user interface controller, the cluster graphical element to be indicative of the type of the cluster.

According to an embodiment, method 100 further includes:

a. Step 118 of obtaining, by the graphical user interface controller, a cluster storage capacity indictor that is indicative of a storage capacity of the cluster. The cluster capacity indicator may include a level of capacity among several levels of capacities, which may be relative to the largest cluster in the group of clusters.
b. Step 128 of automatically setting, by the graphical user interface controller, a size of the cluster graphical element to be indicative of the storage capacity of the cluster, based on the cluster capacity indicator.

According to an embodiment, method 100 also include:

a. Step 140 of receiving, by the graphical user interface controller, a cluster fulness indicator that is indicative of a fullness of the cluster. The cluster fulness indicator may include a level of fullness among several levels of fullness, representing discrete levels from 0% to 100%.
b. Step 150 of automatically generating, by the graphical user interface controller, a graphical cluster fullness element to be indicative of the fullness of the cluster, based on the cluster fulness indicator.

According to an embodiment, the cluster fullness element is a segment of the cluster graphical element that differs by appearance from another segment of the cluster graphical element.

According to an embodiment, the cluster graphical element consists essentially of the cluster fullness element and the other segment of the cluster. For example, the cluster fullness element is darker than the other segment, imitating an eclipse.

According to an embodiment, method 100 further includes:

a. Step 142 of obtaining, by the graphical user interface controller, linkage information regarding a linkage between two or more clusters.
b. Step 152 of automatically generating, by the graphical user interface controller, linkage visual information indicative of the linkage.

According to an embodiment, the linkage visual information is indicative of a type of linkage. The linkage visual information may be a line of a certain type that connects two clusters.

According to an embodiment, the type of linkage is selected out of a replication connection or a global storage sharing.

According to an embodiment, each cluster graphical element represents a planet.

According to an embodiment, the planet is orbited by the one or more orbiting graphical elements that represent one or more moons.

Figure 18:
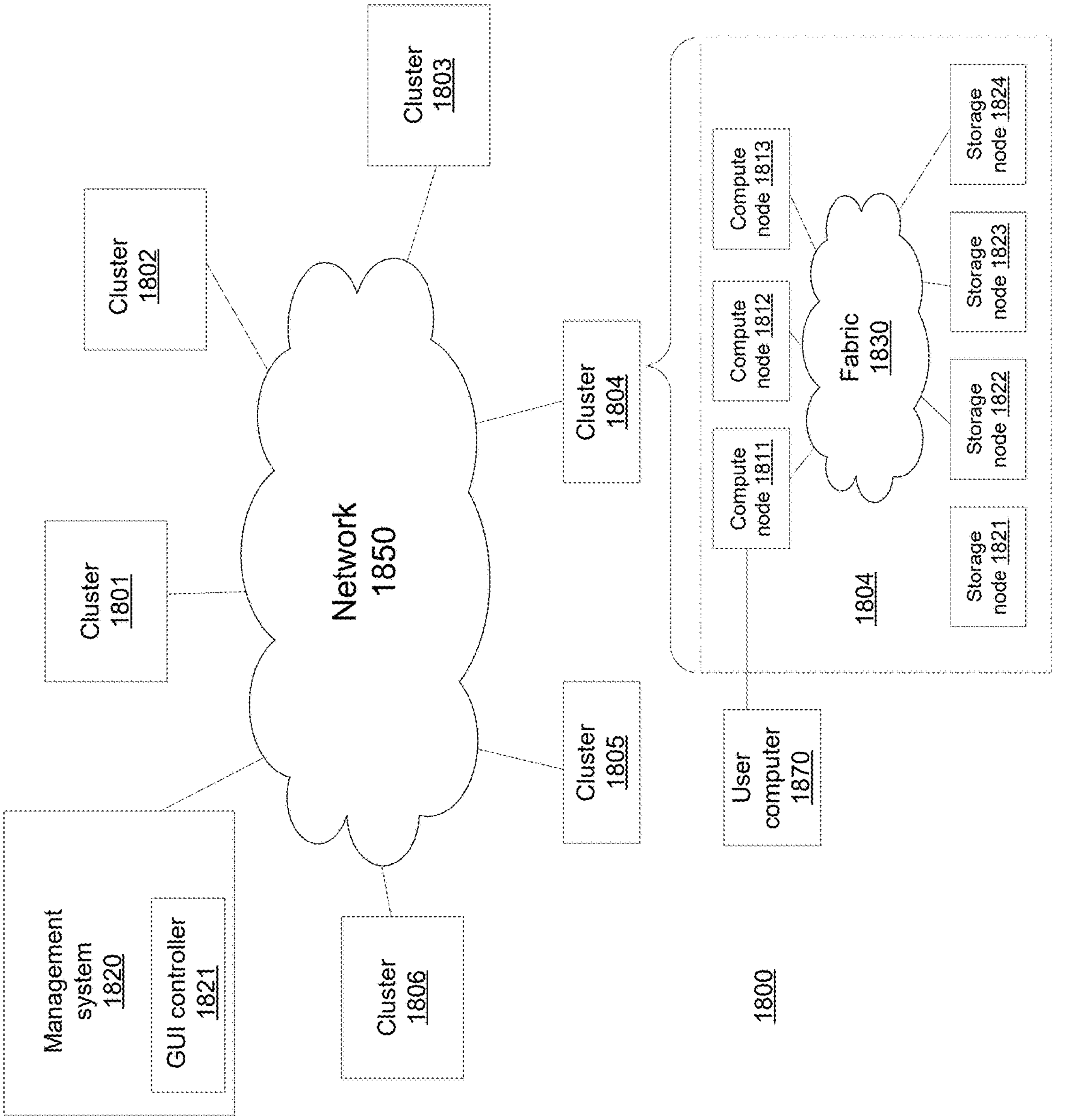
FIG. 18 is an example of a storage system.

FIG. 18 illustrates a configuration 1800 that includes multiple clusters 1801-1806 orchestrated by a management system that include a GUI controller that executes method 100. Each cluster, such as cluster 1804, includes multiple compute nodes, e.g., compute nodes 1811-1813, and multiple storage nodes, e.g., storage nodes, 1821-1824. The compute nodes interfaces the storage nodes via a network, such as fabric 1830. The GUI controller includes one or more processing circuits.

The set of compute nodes and storage nodes are referred to as a cluster of storage related resources. Each storage node further includes storage devices. Different storage nodes include different types and different numbers of storage nodes. Each compute node include one or more processing circuits.

Each compute node is coupled to one or more users (user computers or applications). For example, user computer 1870 is connected to compute node 1811. The performance parameters described herein are obtained in response to the data traffic between the compute nodes of each cluster and the users that access the cluster.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for dynamically displaying performance parameters of a group of clusters of one of more storage related resources, the method comprising:

for each cluster of the group of clusters:

(a) displaying on a graphical user interface screen and under a control of a graphical user interface controller that comprises one or more processing circuits, a cluster graphical element that is orbited by one or more orbiting graphical elements;

(b) obtaining, by the graphical user interface controller, a first currently determined value of a first performance parameter that is selected out of a cluster bandwidth, a cluster latency and a cluster input output activity parameter;

(c) automatically converting, by the graphical user interface controller, the first currently determined value to a first graphical parameter that is a movement parameter of an orbiting graphical element; and (d) automatically moving, on the graphical user interface display, an orbiting graphical element of the one or more orbiting graphical elements according to the movement parameter.

2. The method according to claim 1 wherein the movement parameter is an orbiting speed of the orbiting graphical element.

3. The method according to claim 1 wherein the obtaining comprises determining the first currently determined value by the graphical user interface controller.

4. The method according to claim 1, comprising:

obtaining by the graphical user interface, a second currently determined value of a second performance parameter that differs from the first performance parameter and is selected out of the cluster bandwidth, the cluster latency and the cluster input output activity parameter;

automatically converting, by the graphical user interface controller, the second currently determined value to a second graphical parameter that differs from the first graphical parameter; and displaying the one of more orbiting graphical elements based on the second graphical parameter.

5. The method according to claim 4, wherein the second graphical parameter is a number of the one or more orbiting graphical elements.

6. The method according to claim 4, comprising:

obtaining by the graphical user interface, a third currently determined value of a third performance parameter that differs from each one of the first performance parameter and the second performance parameter, and is selected out of the cluster bandwidth, the cluster latency and the cluster input output activity parameter;

automatically converting, by the graphical user interface controller, the third currently determined value to a third graphical parameter that differs from each one the first graphical parameter and the second graphical parameter; and displaying an orbit graphical element indicative of an orbit of the one of the one or more orbiting graphical elements based on the third graphical parameter.

7. The method according to claim 6, wherein the third graphical parameter is a thickness of the orbit graphical element.

8. The method according to claim 1, comprising receiving, by the graphical user interface controller, a cluster type indicator that is indicative of a type of the cluster, and automatically setting, by the graphical user interface controller, the cluster graphical element to be indicative of the type of the cluster.

9. The method according to claim 1, comprising receiving, by the graphical user interface controller, a cluster storage capacity indictor that is indicative of a storage capacity of the cluster, and automatically setting, by the graphical user interface controller, a size of the cluster graphical element to be indicative of the storage capacity of the cluster.

10. The method according to claim 1, comprising receiving, by the graphical user interface controller, a cluster fulness indicator that is indicative of a fullness of the cluster, and automatically generating, by the graphical user interface controller, a graphical cluster fullness element to be indicative of the fullness of the cluster.

11. The method according to claim 10 wherein the cluster fullness element is a segment of the cluster graphical element that differs by appearance from another segment of the cluster graphical element.

12. The method according to claim 11, wherein the cluster graphical element consists essentially of the cluster fullness indicator and the other segment of the cluster.

13. The method according to claim 1, comprising receiving, by the graphical user interface controller, linkage information regarding a linkage between two or more clusters, and automatically generating, by the graphical user interface controller, linkage visual information indicative of the linkage.

14. The method according to claim 13, wherein the linkage visual information is indicative of a type of linkage.

15. The method according to claim 14, wherein the type of linkage is selected out of a replication connection and a global storage sharing.

16. The method according to claim 1, wherein each cluster graphical element represents a planet.

17. The method according to claim 16, wherein the planet is orbited by the one or more orbiting graphical elements that represent one or more moons.

18. A graphical user interface controller, comprising:

a memory unit configured to store a first currently determined value of a first performance parameter that is selected out of a cluster bandwidth, a cluster latency and a cluster input output activity parameter; wherein each cluster of a group of clusters is represented on a graphical user interface screen and under a control of the graphical user interface controller, by a cluster graphical element that is orbited by one or more orbiting graphical elements; and one or more processing circuit that are configured to:

automatically convert, by the graphical user interface controller, the first currently determined value to a first graphical parameter that is a movement parameter of an orbiting graphical element; and automatically move, on the graphical user interface display, an orbiting graphical element of the one or more orbiting graphical elements according to the movement parameter.

19. A non-transitory computer readable medium for dynamically displaying performance parameters of a group of clusters of one of more storage system related resources, the non-transitory computer readable medium stores instructions for:

executing, for each cluster of the group of clusters:

(a) displaying on a graphical user interface screen and under a control of a graphical user interface controller comprises one or more processing circuits, a cluster graphical element that is orbited by one or more orbiting graphical elements;

(b) obtaining, by the graphical user interface controller, a first currently determined value of a first performance parameter that is selected out of a cluster bandwidth, a cluster latency and a cluster input output activity parameter; wherein the cluster is represented by a cluster graphical element that is orbited by one or more orbiting graphical elements;

(c) automatically converting, by the graphical user interface controller, the first currently determined value to a first graphical parameter that is a movement parameter of an orbiting graphical element; and (d) automatically moving, on the graphical user interface screen, an orbiting graphical element of the one or more orbiting graphical elements according to the movement parameter.

* * * * *